[72] Inventor Ernest A. Thomas
West Springfield, Mass.

[21] Appl. No. 798,648
[22] Filed Feb. 12, 1969
[45] Patented Mar. 2, 1971
[73] Assignee General Instrument Corporation
Newark, N.J.

[54] DIGITAL PUSHBUTTON TUNING FOR SIGNAL-CONTROLLED RECEIVER

27 Claims, 8 Drawing Figs.

[52] U.S. Cl. .......... 334/1, 334/7, 334/15
[51] Int. Cl. .......... H03j 5/00, H03j 5/14
[50] Field of Search .......... 334/1, 7, 14, 15; 331/36 (L), 36 (C), 177 (V); 325/422, 459, 461, 462, 464, 465; 307/320

[56] References Cited

UNITED STATES PATENTS

| | | | |
|---|---|---|---|
| 3,503,018 | 3/1970 | Cavanagh | 334/15 |
| 3,353,117 | 11/1967 | Renkowitz | 334/15X |
| 3,353,126 | 11/1967 | Schucht | 334/15X |
| 3,354,397 | 11/1967 | Wittig | 334/15X |
| 3,439,292 | 4/1969 | Henry | 334/7 |

FOREIGN PATENTS

| | | | |
|---|---|---|---|
| 1,235,391 | 3/1967 | Germany | 334/7 |
| 1,088,539 | 10/1967 | Great Britain | 334/7 |

*Primary Examiner*—Paul L. Gensler
*Attorney*—James and Franklin

ABSTRACT: A tuner for a signal-controlled communication receiver is disclosed, in which a plurality of tuning signal levels are established at a series of terminals. Frequency selecting means comprising pushbutton controlled switch means is provided to selectively operatively connect one of said signal levels to the tuning varactor, thereby to tune the receiver to a desired frequency. The difference between the signal levels at each adjacent pair of terminals is such as to cause the varactor to tune in substantially equal frequency segments along the entire tuning range when signals corresponding to each of the tuning signal levels are applied thereto. The pushbutton control may comprise two sets of pushbuttons, one being effective to select the "tens" and the other to select the "ones" of the desired channel number.

INVENTOR
ERNEST A. THOMAS
BY James and Franklin
ATTORNEY

INVENTOR
ERNEST A. THOMAS
BY James and Franklin
ATTORNEY

INVENTOR
ERNEST A. THOMAS
BY James and Franklin
ATTORNEY

INVENTOR
ERNEST A. THOMAS
BY James and Franklin
ATTORNEY

INVENTOR
ERNEST A. THOMAS
BY James and Franklin
ATTORNEY

DIGITAL PUSHBUTTON TUNING FOR SIGNAL-CONTROLLED RECEIVER

The present invention relates to communication receivers, and particularly to a tuner for use in receivers having a signal-controlled tuning element.

A recent development in the design of tuning circuits, particularly television receivers, is the use of variable reactance devices called varactors, as the tuning elements in the various tuning stages of the receiver. The most commonly used of these devices is the variable capacitance diode, but other devices may be so utilized, such as some field effect transistors having the characteristic that its inductive reactance varies in accordance with the level of the tuning signal applied thereto.

Frequency selection performed by varying the tuning voltage applied to the varactor increases the flexibility of station selection and decreases the bulk and complexity of tuners as compared to those currently in use in television receivers. All that need by provided is a source of preset voltage levels and means to selectively connect the tuning device to one of those sources for each desired channel or station. The voltage-controlled tuning elements take the place of the relatively bulky capacitance and inductive tuning elements used in the conventional television tuners and function without the complex mechanical switching and linkage mechanisms required in the operation of those known television tuners.

The use of varactor tuning in communication receivers is highly suitable for use with pushbutton station selection. The different preset tuning voltages selectively applied to the varactor tuning elements by the selective actuation of different pushbuttons each establishes a reactance value at that element which corresponds to the frequency of the selected channel or station. The use of these variable reactance elements in television tuners, however, has heretofore been limited by their nonlinear reactance-voltage characteristic and the varactors are therefore commonly operated over only a relatively narrow range of their available reactance value, usually only in the linear portions of their reactance-voltage curve. As a result, it has been found difficult in the past to achieve accurate calibration and frequency selection over the tuning range required in a television receiver.

In a UHF television receiver the overall frequency band to be tuned is relatively wide and accordingly a correspondingly wide range of tuning signal voltages must be applied to the tuning varactor. The varactor would then of necessity be operated at least in part over the nonlinear portion of its reactance curve. If the preset tuning voltage levels applied to the varactor for channel selection where set at equal increments, the resulting tuning frequency increments or segments would be unequal. Those segments would be small at one end of the tuning voltage scale and far larger at the other end of that scale. As a result, accurate tuning to individual frequencies or channels within a given segment, such as by the operative connection to the varactor of an additional tuning signal of a level effective to add to or subtract from the initially applied voltage tuning signal, would be difficult to achieve. Those additional tuning signals which would be properly preselected for channel selection within one frequency segment would be improper for channel selection in another frequency segment. Moreover, since the frequency segments are unequal, each containing a different number of channels, it would be difficult to calibrate the channel selector dial in a manner permitting ready channel selection by the viewer. It would be particularly difficult to adequately calibrate the additional channel selectors, since for each selected frequency segment a different number of channels would be made available for selection. Complete digital channel selection in receivers using varactors tuning, such as by the use of pushbutton switches, has for this reason this far not been practicable.

As a result, a completely pushbutton-controlled tuner for TV receivers having UHF receiving capabilities using tuning devices of the varactor-type has heretofore not been commercially feasible.

It is a prime object of the present invention to provide a tuner having a variable reactance tuning element for use in a communication receiver, frequency selection being achieved in a digital manner.

It is a further object of the present invention to provide a pushbutton-controlled tuner for use in a home receiver such as a UHF-VHF television receiver in which station selection over the entire desired range is obtained with consistent accuracy.

It is another object of the present invention to provide a tuner for use in a varactor-tuned communication receiver in which the tuning voltages are selectively applied to the varactors by means of a pair of pushbutton-controlled switches, the first switch selecting the "tens" of the selected channel number, and the other the "ones" of that number.

It is yet another object of the present invention to provide a tuner for use in a communication receiver having separate UHF and VHF tuners in which the pushbutton control utilized for channel selection in either of those bands is also effective to operatively actuate the selected tuner and to deactuate the other unselected tuner.

It is another object of the present invention to provide a tuner for use in a communication receiver which combines the convenience of pushbutton station selection and the economy, reliability and flexibility of use of variable-reactance tuning elements.

To these ends, the present invention provides a tuner for use in a communication receiver, here specifically described as a VHF-UHF television receiver, in which the tuning elements utilized in the tuning stages are variable reactance devices having a nonlinear voltage-frequency characteristic. Means are provided to establish a plurality of different preset voltage levels at a series of terminals, and means are selectively effective to operatively connect one of those voltage levels (and the terminal or terminals associated therewith) to the tuning element to tune the receiver to a selected frequency or channel. The preset signal voltages are such that the overall voltage-frequency curve of the variable reactance device is divided into segments of substantially equal frequency range. In this manner, tuning or channel selection within any given frequency segment, whose limits are defined by the voltage tuning signals at the terminals, is greatly facilitated, since an equal number of stations or channels is available in each frequency segment. Means are provided to modify the signal level at the selected terminal to tune the tuning element to a particular desired frequency within the selected frequency segment. That signal modifying means may comprise a variable tuning impedance, such as a plurality of interconnected precision resistors. The pushbutton-controlled selecting means is effective to operatively connect that variable impedance to a selected one of said terminals, and then to vary the value of that impedance so as to modify the tuning voltage signal applied to the tuning element.

As herein specifically described, the frequency selecting means comprises two sets of pushbutton-actuated switches, one being effective to select the "tens" digit of the desired channel number and the other the "ones" digit of that number. The "tens" switch is effective to select the preset voltage terminal to which the tuning element is operatively connected. The signal modifying impedance is operatively connected to that selected terminal and to the next higher terminal. The voltage levels at these two adjacent terminals, in their action on the varactor connected thereto, define a frequency segment comprising 10 channels which are available for channel selection by subsequent actuation of the signal modifying impedance.

The "ones" switch controls the value of the variable impedance connected to the selected terminal and thus to the tuning element, and provides incremental tuning of the channels within that segment by modifying the resultant tuning voltage applied to the tuning element. That resultant voltage comprises the preset tuning voltage at the selected terminal plus (or minus) a predetermined fraction, as established by the operation of the "ones" controlled switch, of the difference between that voltage and the voltage at the succeeding terminal.

The values of the variable impedances in the signal modifying circuit are chosen such that the voltage profile at the various incremental points defined thereon, when voltage levels from any adjacent pair of terminals are applied across that circuit, substantially conforms to the frequency-voltage profile of the tuning element in each of the frequency segments involved.

Additional circuits, controlled by the "tens" pushbutton switch, are provided to connect a compensating impedance across the succeeding terminal and the terminal next higher in sequence to compensate for changes in impedance loading caused by the switching of the variable impedance to a lower one of said terminals, and to apply a correcting voltage to an intermediate incremental node of the variable impedance means to produce a voltage at that node of a known voltage corresponding to the tuning voltage at the selected terminal. These circuits, individually and in combination, enhance the tuning accuracy of the system.

As a further feature of the present invention, the operation of the pushbutton tuner to select channels in either the UHF or VHF ranges is also automatically effective to actuate the desired tuner in the receiver and to simultaneously deactivate the other tuner.

To the accomplishment of the above, and to such other objects as may hereinafter appear, the present invention relates to a pushbutton digital tuner, as defined in the accompanying claims and as described in this specification, taken together with the accompanying drawings, in which:

Figure 3:
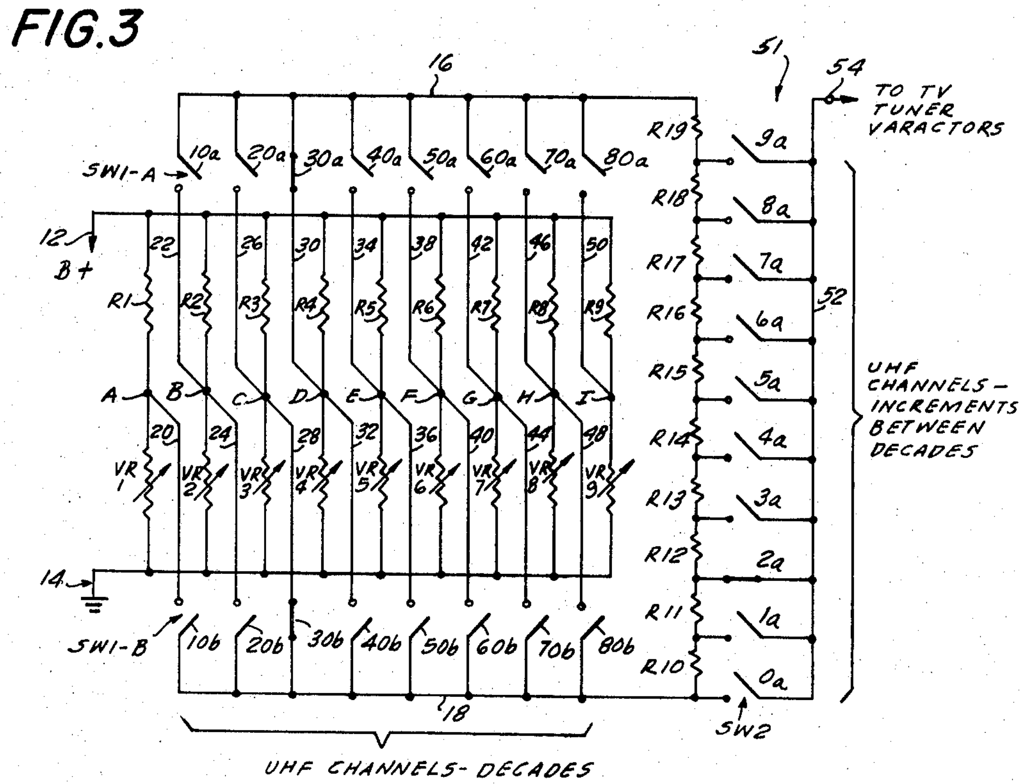
FIG. 3 is a circuit diagram of one embodiment of the tuner of the present invention.
Figure 6:
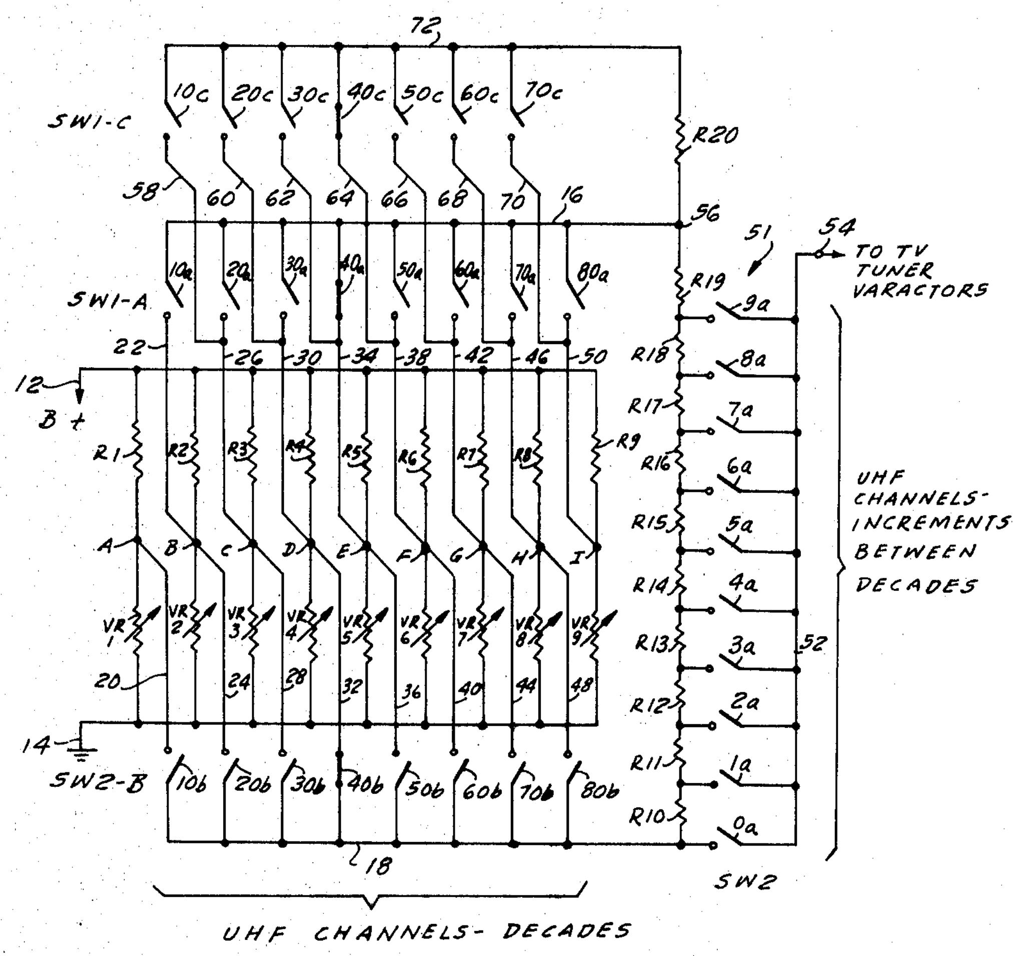
FIG. 6 is a circuit diagram of a second embodiment of the tuner of this invention in which additional switching means are provided to incorporate a compensating resistance.
Figure 7:
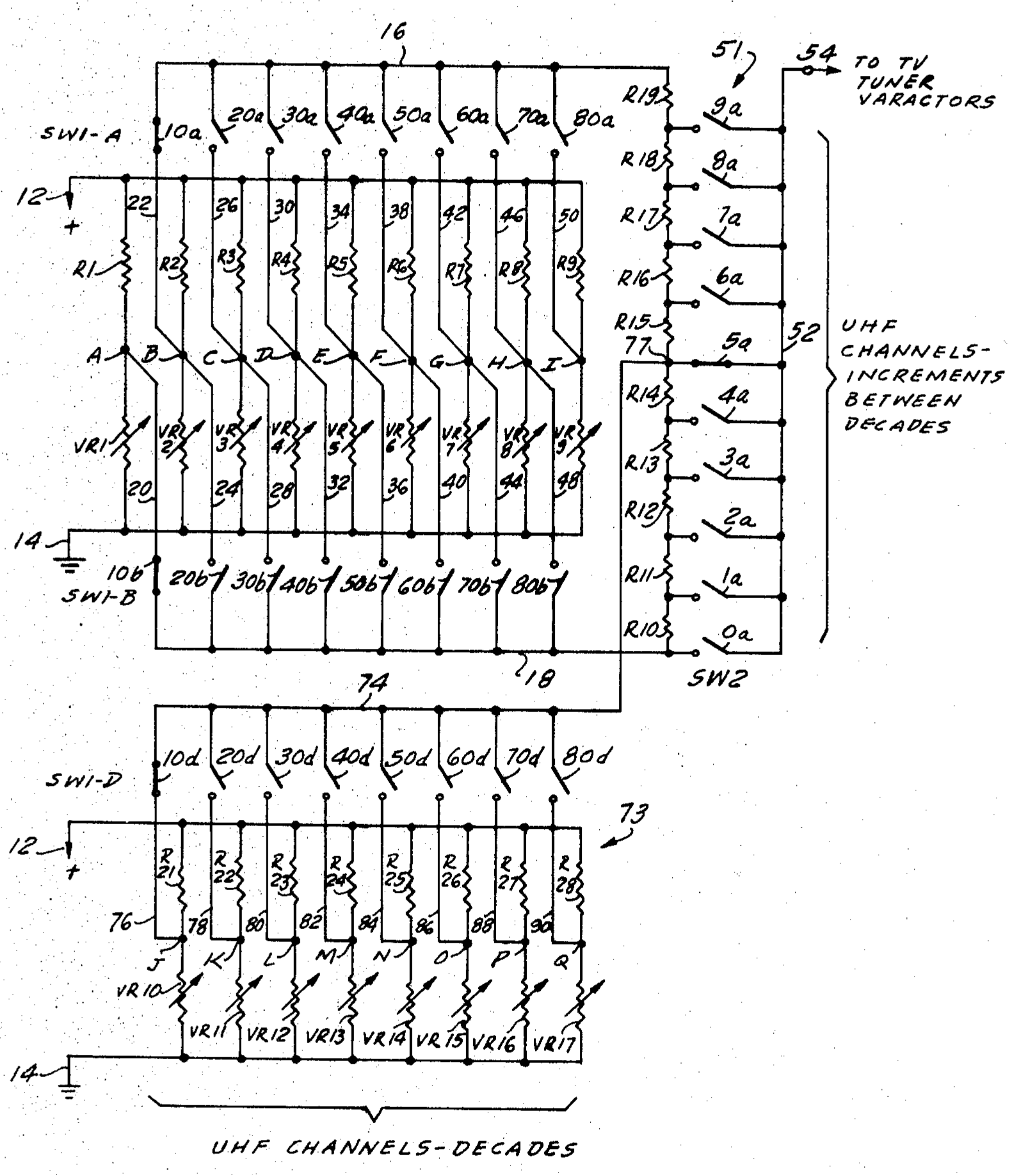
Figure 8:
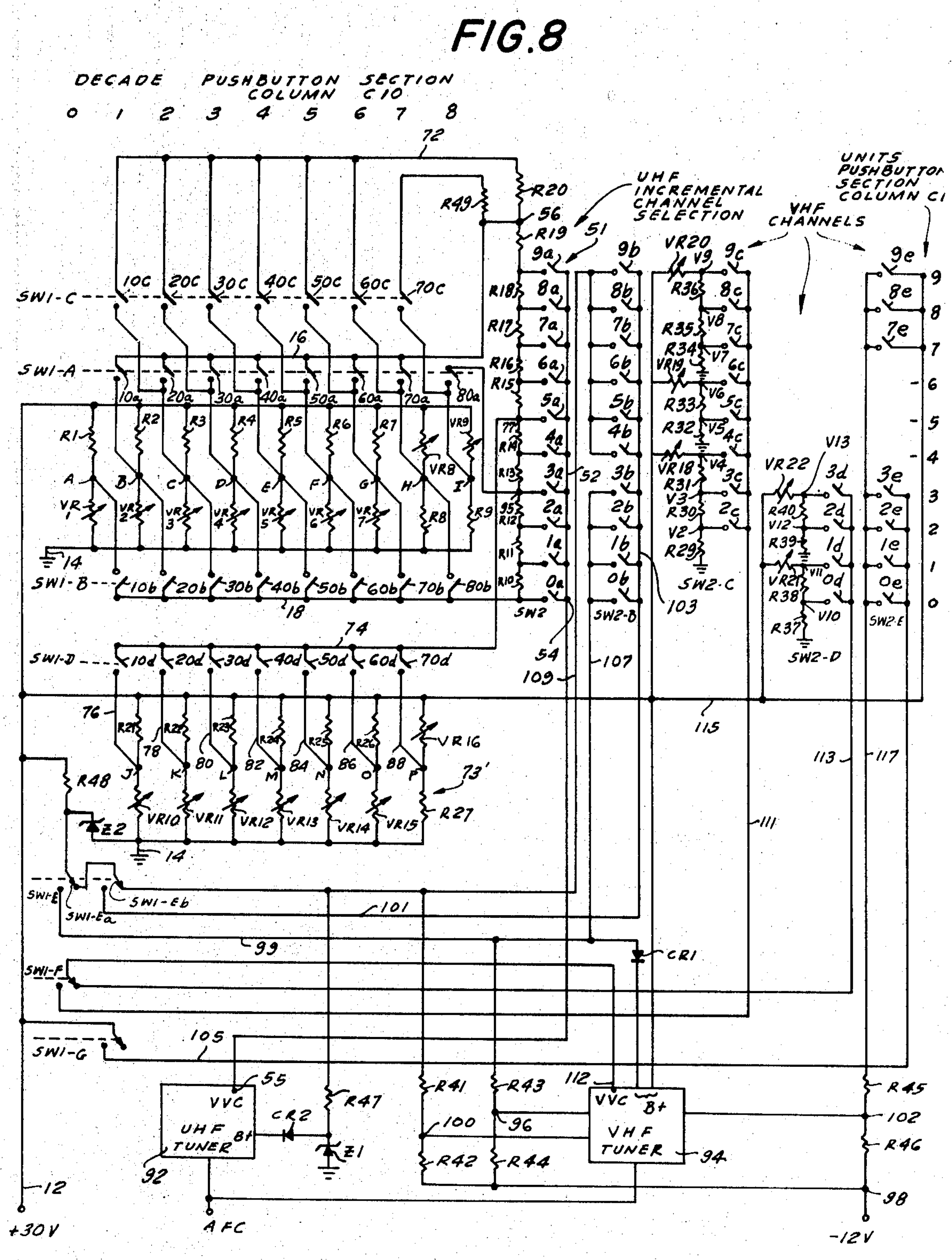

FIG. 7 is a schematic circuit diagram of a third embodiment of the present invention which incorporates the features of the tuner of FIG. 3 and comprises an additional circuit for establishing a known correcting voltage at one node of the incremental tuning circuit; and FIG. 8 is a schematic circuit diagram of a complete UHF-VHF television tuner comprising a UHF tuner which combines the features of the tuners of FIGS. 6 and 7, along with additional circuitry for channel selection in the VHF band.

The present invention provides means for pushbutton-controlled tuning in a communication receive that has particular utility in a television receiver having UHF receiving capabilities, although it may be readily utilized in other receivers such as VHF television receivers, FM radios and the like. Channel selection is achieved by the selective actuation of two pushbuttons. In the television receiver of FIG. 1, a bank of such pushbuttons, generally designated 10, is arranged on the front panel of a television console 11 and is arranged in two vertical columns generally designated C10 and C1. The numbers on the buttons in the column C10 represent the decade or "tens" number of the selected channel, and the numbers on the buttons in column C1 designate the increments or "ones" number of the selected channel.

Figure 2:
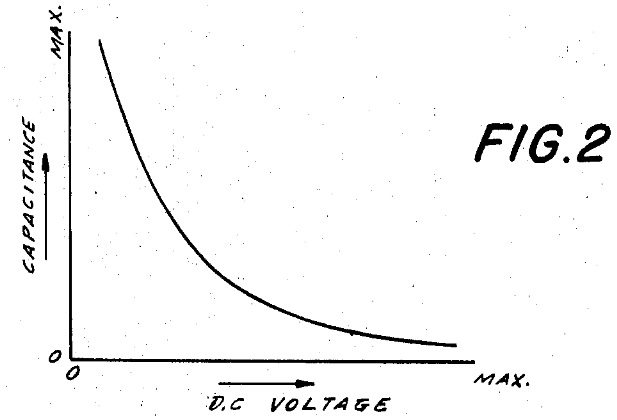
FIG. 2 is a voltage-reactance curve of a typical varactor which may be used as a tuning element in the tuning stages of the television receiver of FIG. 1.

Channel selection is effected by actuating one pushbutton from each of columns C10 and C1, the resulting number formed by the integers on the two actuated pushbuttons thus designating the number of the selected channel. The selective actuation of the pushbuttons is effective to apply a preset tuning voltage to one or a series of varactors or variable reactance devices contained in the various tuning stages of that receiver, such as the *rf* amplifier stages, the local oscillator stages and the mixing stages. These variable reactance devices have the characteristic of acting as a reactance whose value varies according to the level of a tuning voltage applied thereto. A typical device of this type is the voltage-variable capacitance diode which, when a reverse biasing voltage is applied across its terminals, acts as a capacitor whose capacitance value is proportional to the level of that reverse bias voltage. A typical voltage-capacitance curve for such a diode is shown in FIG. 2, in which it can be seen that for a low reverse biasing DC voltage level applied to the diode, the value of its capacitance is relatively high, that value decreasing nonlinearly to a minimum capacitance level as the level of that DC voltage is increased. As the level of the DC voltage applied to the variable capacitance diode varies the value of capacitance of the latter, the resonant frequency of the tuning circuits in which the capacitance diode is connected is likewise modified. The DC voltage signal can thus be considered as a tuning signal the level of which determines the frequencies to which the tuning stages containing these variable capacitance diodes are tuned.

In order for such devices to be practicable in television receivers, particularly in UHF receivers, each variable capacitance diode must be tuned substantially over its entire voltage-capacitance curve. Due to the nonlinearity of that curve, it has been difficult in the past to achieve accurate calibration of the tuning operation of the receiver, primarily for the reason that it has been difficult to achieve substantially equal frequency segments between various tuning points established along that curve for the preset levels of tuning voltages applied thereto. This is particularly significant in a pushbutton-controlled tuner in which incremental tuning within a preselected frequency segment is achieved in discrete or digital steps; it is highly desirable that a substantially equal number of channels be provided in each of these preselected frequency segments. The present invention provides means for achieving such an equal division of the overall frequency-tuning voltage curve of the varactor tuning element over a range of frequencies corresponding to the UHF frequency band. As a result, this tuner is admirably suited for use with the digital pushbutton-controlled tuner herein disclosed.

Figure 4:
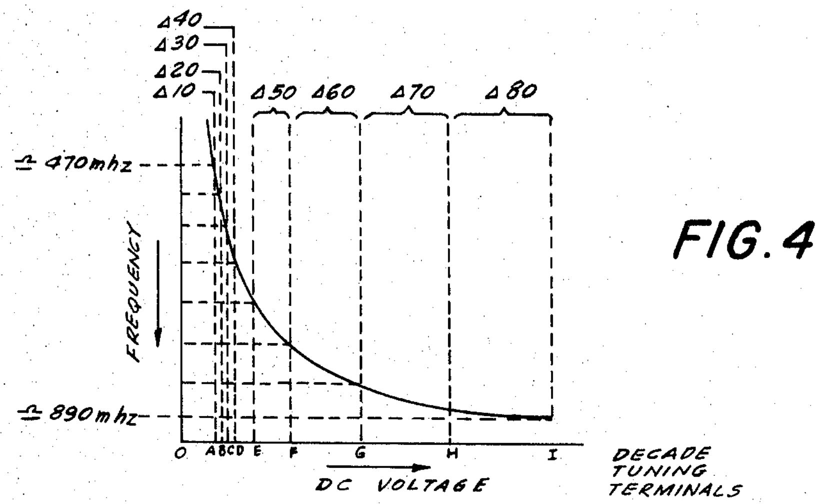
FIG. 4 is a graphical representation of the tuning DC voltage-frequency characteristic of the tuner of the present invention, illustrating the manner in which substantially equal frequency segments are achieved by the proper selection of tuning voltage signals.

Thus, in the circuit of FIG. 3. means are provided to establish different preselected tuning voltage signals at a series of decade tuning terminals A—I. In accordance with one of the features of the present invention, the voltage tuning levels established at these terminals are preselected and preset at respective values such that the difference between the levels at each adjacent pair of these terminals, e.g., terminals D and E, causes the reactance of the tuning element, i.e., the varactor, and thus the tuned frequency, to vary by substantially equal amounts when those tuning signals are applied thereto. This is shown in FIG. 4, which represents the frequency-voltage curve of the tuner when the appropriate DC tuning voltages corresponding to those established at the decade tuning terminals A—I are selectively applied to the varactor. The vertical broken lines represent the DC tuning voltage at the terminals A—I respectively. The intersection of those broken lines with the frequency characteristic curve determines the frequency to which the varactor will tune the receiver tuning circuits when that voltage is applied thereto. By projecting those points of intersection to the vertical axis (which represents that tuning frequency) it will be noted that the frequency segments defined between any two such intersecting points are substantially equal over the entire tuner frequency characteristic curve.

As herein particularly described, the tuner is for use in a UHF television receiver in which the usable tuning range comprises channels 14 through 83 corresponding to a frequency range of between 470 mhz and 890 mhz. The tuning band of 420 mhz defined by these limits is thus divided into seven substantially equal frequency segments, the upper and lower limits of each segment being determined by the preset voltage levels at the decade tuning terminals A—I. These frequency segments are represented in FIG. 4 by the segments Δ10 to Δ80, each segment thus being 60 mhz wide and containing 10 UHF channels. For example, the Δ30 frequency segment contains UHF channels 30—39, one of those channels, say 36, being selected by activating or depressing the pushbutton designated 3 in column C10, and the 6 pushbutton in column C1.

The circuit shown in FIG. 3 illustrates a tuning circuit which comprises the tuning terminals A—I and means for establishing the preselected voltage tuning signal at each of these terminals so that the overall tuning characteristics of the receiver will correspond to that shown in the tuning curve of FIG. 4. The "tens" tuning terminals are defined by the respective junctions of series connected fixed resistors R1—R9 and variable resistors VR1—VR9, each of these series branches of fixed and variable resistors being connected in parallel between a source of B plus voltage at 12 and ground at 14. The potential across each parallel, resistive branch will be the B plus voltage, and thus the respective voltages at each of terminals A—I with respect to ground, that is, the "tens" tuning voltage at those terminals, are established by precisely selecting the relative values of the fixed and variable resistance in each branch. Once the appropriate tuning voltage is established in this manner at each of terminals A—I, one of these terminals may be selected for tuning to a desired frequency segment by operatively connecting one of the terminals, through the operation of a decade selecting switch generally designated SW1, to the tuning varactors in the UHF tuning circuits. Switch SW1, which is mechanically operatively connected to the decade pushbuttons in column C10, comprises two simultaneously actuated switches designated SW1—A and SW1—B, there being eight contacts in each of the switches. The upper contacts 10*a*—80*a* (in switch SW1-A) are each tied to a line 16 and the lower contacts 10*b*—80*b* (in switch SW1-B) are each tied to a line 18. The contacts in switch SW1-A and those in switch SW1-B bearing the same decade numeral, e.g. 10*a* and 10*b*, are simultaneously closed upon the operation of the same pushbutton in the decade column C10 carrying that decade number. That is, the "tens" pushbutton designated 1 in column C10 will simultaneously close contacts 10*a* and 10*b*. Likewise, operation of the "tens" pushbutton designated 5 will simultaneously close switch contacts 50*a* and 50 *b*. As is conventional in pushbutton tuners, only one pushbutton in column C10 will be active at any one time. The "tens" pushbutton designated 0 in column C10 will cause all of the contacts 10*a*—80*a* and 10*b*—80*b* to be open.

The terminals B—H each have two lines connected thereto, one being adapted to be operatively connected to line 16 upon the actuation of its associated contact in switch SW1-A, and the other adapted to be operatively connected to line 18 by the actuation of its associated contact in switch SW1-B, the switch SW1-B contact being next higher in sequence to the switch SW1-A contact. The first and last terminals in the series, i.e. terminals A and I, have only one line connected thereto, terminal A being adapted to be connected to line 18 through the actuated contact 10*b*, and terminal I being adapted to be operatively connected to line 16 through the contact 80*a*. Thus line 20 is connected to terminal A and lines 22 and 24 are connected to terminal B. Lines 26 and 28 are connected to terminal C, lines 30 and 32 are connected to terminal D, lines 34 and 36 are connected to terminal G, lines 38 and 40 are connected to terminal F, lines 42 and 44 are connected to terminal G, lines 46 and 48 are connected to terminal H, and line 50 is connected to terminal I. Upon the selective operation of one of the "tens" pushbuttons in column C10, a pair of contacts, one in switch SW1-A and the other in switch SW1- B, will be actuated or closed to connect one terminal through its associated line and actuated switch contact in switch SW1-B to line 18, and the immediately succeeding terminal in the series through its line and the correspondingly actuated contact in switch SW1-A to line 16. Thus, if the desired channel is within frequency segment Δ30, that is, any one of channels 30 through 39, the "tens" pushbutton 3 will be pushed and contact 30*a* and 30*b* will be closed as shown in FIG. 3. This will operatively connect terminal C through line 28 and contact 30*b* to line 18, and terminal D through line 30 and contact 30*a* to line 16.

Once the "tens" number of the selected UHF channel has been selected in this manner, one of the 10 channels lying within this 10-channel frequency segment is chosen by operating one of the "ones" pushbuttons in column C1 to select that incremental channel within the selected segment. To this end, means operatively associated with the incremental pushbuttons in column C1 are provided to modify the decade tuning voltage signal at the decade tuning terminals A—I, thereby to modify the tuning voltage signal applied to the variable reactance tuning element, thereby to select the desired channel. As shown in FIG. 3, that modifying means is in the form of a variable impedance incremental tuning circuit, generally designated 51, which comprises a plurality of series connected, fixed resistors R10—R19, connected between lines 16 and 18. Upon the actuation of the "tens" switches SW1-A and SW1-B circuit 51 is connected across the selected pair of adjacent "tens" terminals A—I.

An incremental switch SW2 comprises 10 contacts 0*a*—9*a* each connected to a line 52 and a tuning node 54 which is operatively connected to the varactor terminal in the UHF tuning stages (55 in FIG. 8) to supply the tuning voltage signal thereto. The contacts of switch SW2 are selectively actuated upon the operation of one of the "ones" pushbuttons in column C1, the operation of one of those pushbuttons causing one of the contacts of switch SW2 to close, thereby to complete the circuit between line 18 and a preselected number of the fixed resistors in circuit 51 to line 52 and tuning node 54. As the voltage on line 18, when one of switch contacts 10*b*—80*b* is actuated, is the voltage at the selected "-tens" tuning terminal, and the potential at line 16 is that voltage at the next succeeding "tens" tuning terminal, the effective tuning voltage applied to the output node 54 will be the sum of the "tens"tuning voltage at line 18 plus a predetermined fraction (which may include zero, if the 0 button of column C1 is actuated) of the difference between that voltage and the tuning voltage on the next succeeding or higher decade tuning terminal at line 16. The resulting voltage obtained at output node 54 is thus the desired tuning voltage, which will when applied to the tuning elements in the various tuning stages, tune the receiver to select that particular channel number which corresponds to the two actuated pushbuttons, that is the "tens" pushbutton in column C10 and the "ones" pushbutton in column C1.

As shown in FIG. 3, the pushbuttons are operated to select channel 32 by pressing the 3 pushbutton in "tens" column C10, and the 2 pushbutton in "ones" column C. Thus contacts 30*a* and 30*b* of switches SW1-A and SW1-B respectively and contact 2*a* of switch SW2 are all closed to connect terminal C to line 18, terminal D to line 16, and the junction point between incremental resistors R11 and R12 to line 52 and node 54. The tuning voltage at node 54 produced as a result of this circuit will be that voltage which will be effective to tune the various varactors in the UHF tuning stages for reception of channel 32 as desired. If the 0 pushbutton on column C1 is actuated, contact 0*a* is closed and line 18 is directly connected to line 52 and node 54, the tuning voltage at the latter thus being the voltage at the selected decade tuning terminal, e.g. terminal C.

Figure 5:
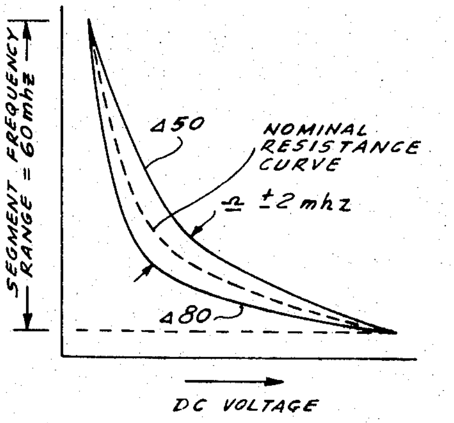
FIG. 5 illustrates frequency-voltage characteristics for two segments of the curve of FIG. 4, showing maximum deviations from nominal frequency-voltage characteristics, superimposed over a voltage profile curve (shown in dotted lines) of the incremental tuning circuit.

The incremental tuning circuit 51 is adapted to select the channels within the 10 channel frequency segments whose limits are defined by the voltages at any adjacent pair of decade tuning terminals A—I and since, as described above, each frequency segment includes the same number of channels, circuit 51 will be effective, with only minor permissible or correctable errors, to tune within each of the seven 60 mhz segments utilized in the UHF band. As shown in FIG. 5, the tuning curves in the Δ50 and Δ80 frequency segments define the maximum deviations from a norm of the tuning characteristics of a typical varactor. By appropriate selection of the values of the resistors R10—R19 to produce the broken line curve of FIG. 5, the profile established for the voltage levels at the respective junction points along circuit 51 will be between the two extreme frequency-voltage curves established in the Δ50 segment and the Δ80 segment. As a result, errors obtained in the incremental tuning within any of the frequency segments established by the tuning signals at the decade tuning terminals are effectively minimized, and may be corrected, if necessary, by an additional fine tuning or automatic frequency control circuit.

The function of the "tens " control switch SW1 is to connect the incremental tuning circuit 51 across the selected "-tens" tuning terminal and the succeeding higher "tens" tuning terminal. To switch circuit 51 across a different pair of "tens" terminals, i.e. to select a channel in a different 10-channel segment, a different one of the decade pushbuttons in column C10 is actuated. The tuning voltages at each of the "tens" terminals A—I is initially adjusted or set when the incremental tuning circuit 51 is connected to that terminal and to the succeeding terminal. (When that frequency segment is selected the incremental circuit will, in fact, be applied thereacross in this manner). When, however, incremental circuit 51 is switched by the operation of the switch SW1 to the next lower "tens" terminal, that adjusted "tens" tuning voltage will decrease due to the removal of the resistive load from the originally considered terminal. This produces difficulty in achieving proper calibration of the "tens" tuning voltages at each of terminals A—I.

For example, the "tens" tuning voltage at terminal H is established when "tens" pushbutton 8 is operated and circuit 51 is connected across terminals H and I. The current flowing through resistor R9 and through circuit 51 adds to the nominal voltage at terminal H established by the relative resistance value of resistor R8 and variable resistor VR8 and by the value of the B plus supply.

When the 7 "tens" pushbutton is operated, circuit 51 is connected between terminals G and H, and is no longer connected to terminal I. As a result the voltage at terminal H will no longer be modified (augmented) by the current flow in resistor R9, and will in fact be slightly decreased, as the current flow through resistor R8 now serves to augment the voltage at terminal G and slightly decreases the voltage at terminal H. This situation obtains for each of terminals B—H.

The circuit of FIG. 6 is provided with means effective to reduce this source of calibration error by selectively connecting a compensating resistance R20, which is connected to the upper terminal of the incremental tuning circuit 51 at point 56, to the next higher "tens" terminal, that is the second succeeding terminal following the then selected tuning terminal. To this end an additional switch SW1–C is provided comprising seven contacts 10*c*—70*c*, all connected between a line 72 and lines 58—70 respectively, lines 58—70 being in turn respectively connected to lines 26, 30, 34, 38, 42, 46 and 50. Switch SW1–C is actuated along with switch SW1–A and SW1–B upon the selective operation of the appropriate one of the "tens" pushbuttons in column C10 to close that one of its contacts designated by the "tens" numeral carried by that pushbutton. Thus, as in FIG. 6, if pushbutton 4 in column C10 is operated, contacts 40*a* and 40*b* will be closed and terminals D and E will be operatively connected to lines 18 and 16 respectively, and contact 40*c* will also be closed to connect line 72 through lines 64 and 38 to terminal F, the next higher terminal. Line 72 is in turn connected to resistor R20, so that when the incremental circuit 51 is connected across decade tuning terminals D and E, resistor R20 will be connected across terminals E and F, thereby to provide a resistive load to the latter pair of terminals comparable to that which was applied thereto when "tens" pushbutton 5 was operated. As a result the tuning voltage level initially set at terminal E will not be significantly affected by the switching of the incremental circuit 51 to the next, lower "tens" tuning terminal. The value of resistor R20 is preferably established at more than one-half the sum of resistors R10—R19.

As was explained with reference to the incremental resistor voltage profile curve of FIG. 5, the values of resistors R10-—R19 are selected to achieve a profile to match as closely as possible the frequency-voltage characteristic curves of the varactor for each of the frequency segments derived by the "-tens" tuning voltage levels. Thus, while the tuning within any given frequency segment will be relatively precise at the upper and lower limits of that segment, at the middle of the segment corresponding to the 5 incremental channels, e.g. channel 35, there will be a slight tuning error which may be large enough to require the use of a fine tuning instrumentality. To minimize this source of error an additional voltage correcting circuit 73, as shown in FIG. 7, applies a correcting voltage to a selected one of the junction points of the incremental resistors, and as herein particularly shown, to the middle junction point 77 between resistors R14 and R15 of circuit 51 (corresponding to the 5 channel of the selected "tens" segment). That voltage correcting circuit 73 comprises a series of eight correcting terminals J—Q, which are respectively defined at the junctions of fixed resistors R21—R28 and variable resistors VR10—VR17. These eight series resistance branches are connected in parallel between the B plus voltage source 12 and ground 14. An additional switch SW1–D is provided having contacts 10*d*—80*d* connected between line 74 and terminals J—Q respectively via lines 76—90 respectively. One of those contacts, bearing the corresponding "tens" prefix numeral, is actuated along with the corresponding contacts in switches SW1–A and SW1–B upon the operation of the corresponding "tens" pushbutton in column C10. That is, if as shown in FIG. 7, "tens" pushbutton 1 is operated, switch contact 10*d*, along with switch contacts 10*a* and 10*b*, are closed and terminal J is connected through line 76 and contact 10*d* to line 74 and thus, to point 77 to apply to point 77 the correcting voltage at terminal J. The correcting voltages at terminals J—Q are established by precisely selecting the relative values of the fixed and variable resistors of each of the series branches defining those terminals. It will be noted that there is a correcting terminal for each of the decade tuning terminals A—I. Thus, for providing a correcting voltage to the midpoint of each "tens" frequency segment, the voltage at the corresponding correcting terminal should be approximately equal to the average of the tuning voltages at the corresponding "tens" tuning terminal and the tuning voltage at the next "tens" tuning terminal. For any selected "tens" tuning terminal, an appropriate midpoint correcting voltage will thus be applied to point 77, making the error at the 5 unit channel in each "tens" segment essentially zero. The correcting voltage applied to circuit 51 in this manner also tends to correct the incremental tuning signals at the other incremental points of circuit 51 by establishing a second reference voltage at point 77. As a result improved accuracy of tuning within the selected 10-channel frequency segment is achieved.

The tuning circuit of FIG. 8 illustrates a television tuner in which the basic circuit of FIG. 3 is utilized along with the compensating circuit R20 of FIG. 6 and the correcting circuit 73 of FIG. 7. That tuning circuit further includes a VHF tuning circuit and a switching circuit operatively connected to the channel select pushbuttons to operate the receiver in a selected band depending on which of the channels has been selected by the pushbutton channel selector. At the present time, VHF channels are those lying between channels 2 and 13. The pushbutton bank of FIG. 1 can be utilized to select channels within the VHF band between channels 2 and 9 by pushing the 0 button in the column C10 and then by pushing that button in column C1 carrying the desired VHF channel number. To select one of channels 10—13, the 1 pushbutton in column C10 is operated and any of the 0—3 buttons in column C1 is operated, to form the complete channel number, e.g. channel 13. UHF channel selection for any one of channels 14—83 is performed in the manner described above by actuating the appropriate buttons in columns C10 and C1.

Switching and logic circuitry is provided to apply operating potential to the UHF tuner 92 when the pushbuttons are actuated to select a channel in the UHF band, and to supply operating potential to the VHF tuner 94 when the pushbuttons are actuated to select channels lying within the VHF band.

This is accomplished by establishing VHF operation whenever the 0 button of column C10 is actuated, and by connecting a switch operated by the 1 pushbutton in column C10 with a switch controlled by any one of the 0, 1, 2, or 3 buttons in column C1 in an AND circuit configuration. The actuation of the 0 "tens" pushbutton, or any combination of the 1 "tens" pushbutton with the 0 to 3 "ones" pushbutton will thus provide VHF receiver tuner operation. Operation of the pushbutton channel selectors to select any of the UHF channels will switch the operating potential to the UHF tuner 92 and will supply a suitable signal to the VHF tuner 94 to cause the later to operate as an *i.f.* stage.

The circuitry for deriving the tuning voltage signals for UHF channel selection is substantially the same as that shown in FIGS. 3, 6 and 7, and all corresponding components in FIG. 8, are identified with reference numerals similar to those employed to those FIGS. Minor changes have been made to satisfy certain design criteria such as the reversal of variable resistors VR8 and VR9 and fixed resistors R8 and R9 respectively, to enable the establishment of the relatively higher tuning voltage signals required at terminals H and I for channel selection above channel 70. A similar modification for similar reasons is made in the voltage correcting circuit 73′ by reversing the relative positions of variable resistor VR16 and resistor R27 between B plus and ground. As the UHF band terminates at channel 83, contact 80*a* rather than being connected to the upper end of the circuit 51, i.e. to resistor R19 as in FIG. 3, is now directly connected to a junction 95 defined between resistors R12 and R13. Thus when the 8 decade pushbutton is operated, terminal I is connected to junction 95 rather than line 16, as in FIG. 3. As a result of this connection, the tuning voltage level established at terminal I, for tuning above channel 80, need be at a level corresponding only to channel 83, rather than the relatively large voltage required for tuning to the unused channel 90, thereby to provide a substantial reduction in the maximum required tuning voltage established at tuning terminal I. An additional resistor R49 is connected at the junction between resistors R19 and R20, and upon the activation of the 7 "tens" pushbutton, contact 70*c* will close and connect resistance R49 to terminal I to provide the same resistive load compensating function with respect to the tuning voltage at terminal I as is provided by resistor R20 for the lower terminals B—H. The value of resistor R49 is approximately equal to the sum of resistors R10—R12, the resistors which it effectively replaces across terminal I when the 7 "tens" pushbutton is operated after operation of the 8 "-tens" pushbutton. A further consequence of the restriction of the uppermost UHF channel to channel 83 rather than 90, is that the voltage correcting circuit 73 which as shown in FIG. 7, required eight terminals, now requires only seven, since no midpoint correction is needed at what would correspond to channel 85. Thus, circuit 73′ only comprises seven series branches defining correcting terminals J—P which perform a midpoint voltage correction on the incremental tuning circuit 51 as described above.

The VHF channel selection in the tuner of FIG. 8 is accomplished by applying a selected tuning voltage to the varactor of the VHF tuner 94 at 112, in contrast to the use of a rotary mechanical tuning switch used to selectively insert tuning slugs or inductances into the various tuning stages of the conventional VHF receiver. Twelve VHF channel select terminals V2—V13, corresponding to each of the 12 VHF channels 2—13, are provided at which a predetermined tuning voltage is established by means of fixed resistances R29—R40 and variable resistances VR18—VR22 connected between the B plus supply and ground, in the manner shown in FIG. 8. The resistance values of these fixed and variable resistors are set to establish the appropriate tuning voltages at VHF terminals V2—V13. The selective connection of one of these VHF terminals to the varactor in VHF tuner 94 is effected through the contacts of switches SW2–C and SW2–D which are actuated in response to the operation of the corresponding pushbutton in column C1.

As in conventional VHF receivers, the VHF band is divided into two tuning bands, i.e. a low band comprising channels 2—6 and a high band comprising channels 7—13. Switching means are provided in the tuner to switch VHF tuner 94 to a desired operating mode corresponding to the pushbutton-selected VHF channel. The "tens" pushbutton-operated switch SW1 is provided with an additional switch SW1–E (comprising two contacts SW1–E*a* and SW1–E*b*) and switches SW1–F and SW1–G (each having only a single contact). Contact SW1–E*a* is actuated upon the depression of the 0 "tens" pushbutton, and contact SW1–E*b* is actuated by the operation of the 1 "tens" pushbutton. The single contact of switch SW1–F is actuated on the operation of the 0 "tens" pushbutton and the contact of switch SW1–G is actuated upon the actuation of the 1 "tens" pushbutton. These contacts, all shown in their unactuated condition in FIG. 8, are tied to the B plus source 14, and are effective when closed to direct the B plus voltage to a desired location in the circuit to effect either VHF or UHF tuner operation, in accord with the condition of the 0 or 1 "tens" pushbuttons. Thus, when the 0 "tens" pushbutton is depressed, indicating that VHF operation is to be performed, contact SW1–E*a* is closed to apply the B plus voltage to line 99 and, through diode CR1, to the VHF tuner 94, and to the upper terminal of resistor R43 which is joined at a junction 96 to one terminal of resistor R44, the other terminal of which is tied to a minus 12 volt supply at 98. As a result, a positive voltage appears at junction 96 which is applied to a switching circuit in VHF tuner 94 to actuate the local oscillator stage to operate tuner 94 in its desired manner for VHF reception. At the same time, the closing of contact SW1–E*a* causes the B plus voltage to be removed from resistor R41 which defines a junction 100 with one terminal of resistor R42, the other terminal of the latter being connected to the minus 12 volt supply. At this time, since no B plus appears at resistor R41, the potential at junction at junction 100 is negative, that voltage being applied to a second switching circuit within the VHF tuner 94 to tune the amplifying stages in that tuner to the RF range rather than to the IF range as is desired for UHF operation.

VHF selection may also be established by operating the 1 pushbutton in column C10 and any of the pushbuttons 0—3 in column C1. When this occurs, contact SW1–E*a* is returned to its open position shown in FIG. 8, and contact SW1–E*b* and the contact of switch SW1–G are both closed so that the B plus voltage is now supplied through the closed contact SW1–E*b* to line 101 and to a common line 103 of switch SW1–B, comprising contacts 0*b*—9*b*. The B plus voltage is also applied through the closed contact of switch SW1–G to line 105 and contacts 0*e*—3*e* of switch SW2–E. For VHF operation any of pushbuttons 0—3 in column C1 is operated (corresponding to selection of VHF channels 10—13), thereby to actuate the corresponding numbered contact in switches SW2–SW2–E. The closing the appropriate contact in switches SW2–B, i.e. any of contacts 0*b*—3*b*, connects line 103 to line 107 to once again apply the B plus voltage to the VHF tuner 94 and to develop a positive voltage level at junction 96, as is required for VHF operation. On the other hand, if the operation of the 1 "tens" pushbutton were followed by operation of any of pushbuttons 4—9 in "ones" pushbutton column C1, corresponding to a selection of UHF channels 14—19, one of the contact 4*b*—9*b* of switch SW2–B will be closed and line 103 will be connected through that closed contact to line 109 and thus through the resistor R47 and diode CR2 to the B plus terminal of UHF tuner 92 in a manner to actuate that tuner for UHF reception. A Zener diode Z1 is connected between ground and the junction of diode CR2 and resistor R47 to drop the B plus voltage to a proper level for UHF tuner operation. At the same time, a positive voltage is applied to resistor R41 and to junction 100, and since resistor R43 no longer has a positive potential voltage applied thereto, the voltage at junction 96 becomes negative. These voltages at junctions 96 and 100 are affective to control switching circuitry within VHF tuner 94 to deactivate the local oscillator stage in that tuner, and to modify the amplifier stage to operate as an IF stage as desired for UHF reception.

The tuning voltage terminals V2—V9 for VHF channels 2—9 are established at the junction of resistors R29—R36 and the variable resistors VR18—VR20, each of these tuning terminals being respectively connected to the normally open contacts *2c*—*9c* of switch SW2–C. The tuning voltage terminals V10—V13 associated with VHF channels 10—13 are defined by the junctions of resistors R37—R40 and variable resistors VR21 and VR22, and are respectively connected to the normally open contacts *od*—*3d* of switch SW2–D. The contacts of switch SW2–E are divided into an upper section comprising contacts *7e*—*9e* associated respectively with VHF channels 7—9, and contacts *0e*—*3e* respectively associated with VHF channels 10—13. The operation of the VHF channel selection is as follows:

For selecting any of channels 2—9, the O "tens" pushbutton in column C10 is depressed to initiate VHF operation as described above, and the desired VHF channel is then selected by depressing any corresponding one of the pushbuttons 2—9 in column C1. Operation of the "ones" pushbutton is effective to close the corresponding contact of switches SW2–C, SW2–D and SW2–E, although it will be noted that switch SW2–C has no contact actuated by the depression of either the 0 or 1 "ones" pushbutton, switch SW2–D has no contacts corresponding to the 4—9 "ones" pushbutton, and switch SW2–E has no contacts corresponding to the 4—6 "ones" pushbuttons. If channel 2 is the selected channel, the operation of the 2 button in column C1 would close contacts *2c*, *2d* and *2e*, to connect the channel 2 voltage terminal V2, defined by resistors R29 and R30, to line 111 which is connected through the contact of switch SW1–F (closed upon the operation of the 0 "tens" pushbutton) to the varactor terminal 112 of the VHF tuner 94. The tuning voltage terminal associated with channel 12, i.e. V12, the junction of resistors R38 and R39, is connected through closed contact *2d* to line 113 and to the open contact of switch SW1–F (open when the 0 "tens" pushbutton is operated) so that that tuning signal will not be applied to the tuning element in the VHF tuner 94. As contacts *7e*—*9e* of switch SW2–E remain open, the B plus supply at line 115 is not connected to the upper terminal of resistor R44 and the voltage at junction 102, defined between resistors R45 and R46, remains negative, as resistor R46 is tied to the minus 12 volt supply. For a negative voltage at junction 102, the high-band switching circuit in VHF tuner 94 connected to that junction will not be actuated, the tuner 94 will operate to receive channels at its lower band, including channel 2, as desired.

For operation in the higher VHF band, that is, channels 7—13, the VHF tuner 94 is switched to its high-ban operating mode. To select channel 7, for example, the 0 "tens" pushbutton and the 7 "ones" pushbutton are operated, closing contacts *7c* and *7e*. The closing of the former applies the channel 7 tuning voltage to line 111 and to the VHF varactor at 112. The closing of the latter connects the B plus voltage at line 115 to line 117 and to resistor R45. Junction 102 becomes positive and the VHF tuner 94, in response to that positive voltage, is switched to its high-band mode of operation. Selection of VHF channels 8 and 9 by the operation of the 8 or 9 pushbutton in column C1 is similar to that described above for channel 7 selection. For selection of one of VHF channels 10—13 the 1 "tens" pushbutton and a selected one of the 0—3 "ones" pushbuttons are operated. The operation of the former opens contact SW1–E*a* and the contact of switch SW1–F, and closes contact SW1–E*b* and the contact of switch SW1–G. As described above, for this condition of these switch contacts, the B plus voltage is applied only to VHF tuner 94. Furthermore, line 111 is now connected to the open contact of switch SW1–F to prevent tuning redundancy between channels 2 and 12, 3 and 13, as the VHF tuning voltage is derived only from line 113 connected to the VHF tuner through the unactuated contact of switch SW1–F.

Selection of any of VHF channels 10—13 closes a corresponding one of contacts *0e*—*3e* in switch SW2–E, thereby to connect line 105 (connected to the B plus supply through the closed contact of switch SW1–G) to resistor R45 to establish a positive voltage at junction 102 for operation of VHF tuner 94 at its high-band mode. As described above, for operation at UHF channels 14 and above, the B plus potential will be redirected to the VHF and UHF tuners to establish the desired potentials at these tuners for UHF reception. If desired the B plus voltage for UHF and VHF operation may be further reduced by connecting a resistor R48 and a second Zener diode Z2 between the B plus line 12 and ground, prior to the switch contacts of switch SW1–E.

For an exemplary UHF-VHF television tuner of FIG. 8, the following tuning voltages were established at the "tens" tuning terminals A—I for UHF tuning to achieve the desired equal frequency segments over the entire UHF range, i.e. from channel 14 to channel 83.

| "Tens" Tuning Terminal | DC Volts |
|---|---|
| A | 1.29 |
| B | 2.49 |
| C | 3.90 |
| D | 5.60 |
| E | 7.60 |
| F | 10.0 |
| G | 13.9 |
| H | 21.0 |
| I | 29.5 |

The tuning voltages for VHF channels 2—13 were, in that exemplary tuner, preset at the following levels:

| Channel | DC Volts |
|---|---|
| 2 | 2 |
| 3 | 3.4 |
| 4 | 5.4 |
| 5 | 11.3 |
| 6 | 15.0 |
| 7 | 5 |
| 8 | 5.6 |
| 9 | 6.3 |
| 10 | 7.1 |
| 11 | 8.2 |
| 12 | 9.8 |
| 13 | 12.4 |

For the voltage correcting circuit 73 the following correcting voltages were established at terminals J—P:

| Correcting Terminal | DC Volts |
|---|---|
| J | 1.82 |
| K | 3.18 |
| L | 4.70 |
| M | 6.51 |
| N | 8.80 |
| O | 11.65 |
| P | 16.70 |

The tuning voltage values for both the VHF and UHF tuning circuits are given merely to illustrate particular circuit design which fulfills the design criteria set forth above, but are in no way intended to define this invention or limit the scope thereof.

Figure 1:
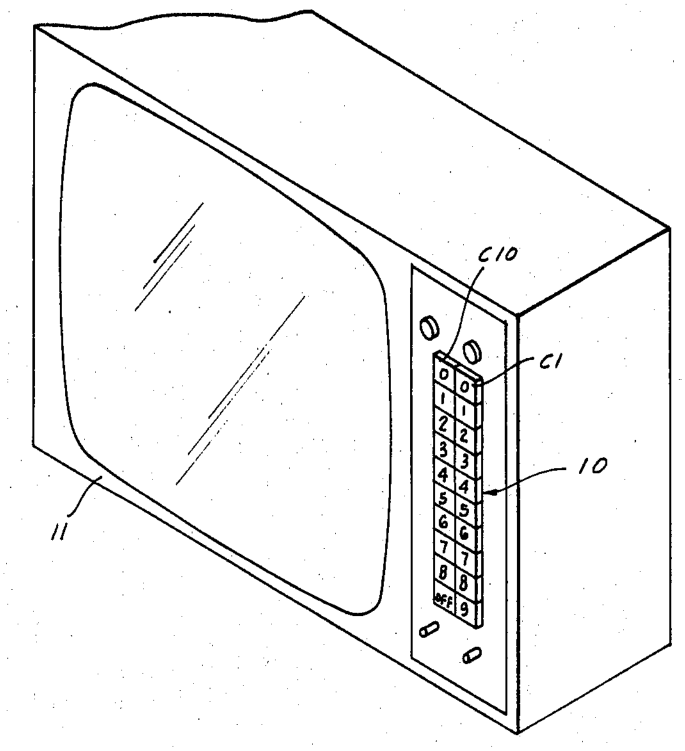
FIG. 1 is a perspective view of a television receiver in which the pushbutton digital tuner of this invention is incorporated and which illustrates a typical arrangement of the tuning pushbuttons on the receiver console.

Since the UHF band ends at channel 83, and the 0 button in the "tens" pushbutton column is used for VHF channel selection, an additional pushbutton is available in the "tens" pushbutton column C10, which may be used for turning the receiver on and off as shown in FIG. 1. Additional pushbuttons may also be provided in either of the pushbutton columns C10 and C1 to select radio or phonograph operation in a combination television and radio receiver.

The present invention has thus provided an improved tuner, and particularly one for use in a UHF television receiver, in which channel selection is readily and accurately effected by a digital pushbutton operation. By that operation the "tens" number of the channel is selected by the operation of one of a first set of pushbuttons, and the "ones" number of that channel is effected by the operation of one of a second set of pushbuttons. Channel selection effected in this manner requires no additional fine tuning operation and thus may be effected without the use of complex mechanical tuning mechanism such as has heretofore been required in television tuners of this type. Tuning is effected quickly and accurately and requires a minimum of effort on the part of the viewer.

The use of completely digital pushbutton tuning is made possible by the provision of equal frequency segments obtained by the operation of the "tens" control pushbuttons, with each of the frequency segments containing an equal number of channels e.g., 10.

The use of varactor tuning elements in a UHF receiver, heretofore though to be unsuited because of the relatively wide tuning range required for UHF reception, is now practical as a result of the manner in which the varactor is tuned.

Digital pushbutton tuning is more convenient than the presently employed analogue tuning and provides a ready visual indication of the channel selected without the requirement of additional channel indicating means such as dials provided on the conventional television tuner for this purpose—the viewer merely notices which two pushbuttons are depressed to form the channel number to which the TV receiver is tuned.

The circuits specifically described herein can be widely modified while still achieving the same overall results and means other than pushbutton-controlled switches may be employed to apply the selected tuning voltage signals to the varactor tuning stages.

While several embodiments of the present invention have been herein specifically disclosed, it will be apparent that many other variations may be made thereto without departing from the spirit and scope of the invention.

I claim:

1. A tuner for use in a communication receiver comprising a tuning element having a predetermined correspondence between its tuned frequency and the level of a tuning signal applied thereto, said tuner comprising a series of terminals, means effective to establish a different predetermined signal level at each of said terminals, the difference between the signal levels at each adjacent pair of terminals in said series of terminals being such as to cause the tuned frequency of said tuning element to vary in substantially equal increments when signals at said levels are applied thereto, and selecting means effective when actuated to operatively connect a selected one of said terminals to said tuning element, thereby to cause said tuning element to have a desired tuning frequency, further comprising signal modifying means for selectively tuning said tuner to frequencies within said increments, said selecting means comprising means effective to operatively connect said modifying means to said selected one of said terminals and to said tuning element, and in which said modifying means comprises a plurality of impedance elements, said selecting means comprising means effective to selectively operatively connect different numbers of said impedance elements to said tuning element.

2. The tuner of claim 1, in which the values of said impedance elements and the action of said selecting means are such that the voltage profile defined by the voltage levels applied to said tuning element as said selecting means is actuated substantially conforms to the voltage-reactance profile of said tuning element over the range involved.

3. A tuner for use in a communication receiver comprising a tuning element having a predetermined correspondence between its tuned frequency and the level of a tuning signal applied thereto, said tuner comprising a series of terminals, means effective to establish a different predetermined signal level at each of said terminals, the difference between the signal levels at each adjacent pair of terminals in said series of terminals being such as to cause the tuned frequency of said tuning element to vary in substantially equal increments when signals at said levels are applied thereto, and selecting means effective when actuated to operatively connect a selected one of said terminals to said tuning element, thereby to cause said tuning element to have a desired tuned frequency, and further comprising signal modifying means for selectively tuning said tuner to frequencies within said increments, said selecting means comprising means effective to operatively connect said modifying means to said selected one of said terminals and to said tuning element, in which said signal level establishing means comprises a plurality of impedance means connected in parallel across a voltage source, said terminals comprising two sets of contacts, the contacts of one set being connected to intermediate points on the first and subsequent impedance means counting from said source, the contacts of said other set being connected to intermediate points on the second and subsequent impedance means, counting from said source.

4. The tuner of claim 3, in which said modifying means comprises a variable tuning impedance means, said selecting means comprising second means effective to vary the impedance of said tuning impedance means.

5. The tuner of claim 3, in which said modifying means comprises a variable tuning impedance means, said selecting means comprising means effective to operatively connect a predetermined portion of said tuning impedance means between said selected contacts of said two sets of contacts.

6. The tuner of claim 5, in which said variable impedance means comprises a plurality of impedance elements, said connecting means comprising means effective to selectively operatively connect different numbers of said impedance elements to said tuning element.

7. The tuner of claim 6, in which the values of said impedance elements and the action of said selecting means are such that the voltage profile defined by the voltage levels applied to said tuning element as said selecting means in actuated, substantially conforms to the voltage-reactance profile of said tuning element over the range involved.

8. In the tuner of claim 5, a compensating impedance, said selecting means comprising means for connecting said compensating impedance between the higher numbered contact to which said variable tuning impedance means is connected and the contact of the next higher number counting from said source.

9. A tuner for use in a communication receiver comprising a tuning element having a predetermined correspondence between its tuned frequency and the level of a tuning signal applied thereto, said tuner comprising a series of terminals, means effective to establish a different predetermined signal level at each of said terminals, the difference between the signal levels at each adjacent pair of terminals in said series of terminals being such as to cause the tuned frequency of said tuning element to vary in substantially equal increments when signals at said levels are applied thereto, and selecting means effective when actuated to operatively connect a selected one of said terminals to said tuning element, thereby to cause said tuning element to have a desired tuned frequency, further comprising signal modifying means for selectively tuning said tuner to frequencies within said increments, said selecting means comprising means effective to operatively connect said modifying means to said selected one of said terminals and to said tuning element, in which said modifying means comprises a variable tuning impedance means, said selecting means comprising second means effective to vary the impedance of said variable tuning impedance means, in which said means effective to vary the impedance of said variable tuning impedance means is manually actuatable independently of said means for connecting a selected one of said terminals to said tuning element.

10. The tuner of claim 9, in which said modifying means comprises a plurality of impedance element, said selecting means comprising means effective to selectively operatively connect different numbers of said impedance elements to said tuning element.

11. The tuner of claim 10, in which the values of said impedance elements and the action of said selecting means are such that the voltage profile defined by the voltage levels applied to said tuning element as said selecting means is actuated, substantially conforms to the voltage-reactance profile of said tuning element over the range involved.

12. The tuner of claim 9, in which said signal level establishing means comprises a plurality of impedance means connected in parallel across a voltage source, said terminals comprising two sets of contacts, the contacts of one set being connected to intermediate points on the first and subsequent impedance means counting from said source, the contacts of said other set being connected to intermediate points on the second and subsequent impedance means, counting from said source.

13. The tuner of claim 12, in which said modifying means comprises a variable tuning impedance means, said selecting means comprising second means effective to vary the impedance of said tuning impedance means.

14. The tuner of claim 12, in which said modifying means comprises a variable tuning impedance means, said selecting means comprising means effective to operatively connect a predetermined portion of said tuning impedance means between said selected contacts of said two sets of contacts.

15. In the tuner of claim 14, a compensating impedance, said selecting means comprising means for connecting said compensating impedance between the higher numbered contact to which said tuning impedance means is connected and the contact of the next higher number counting from said source.

16. In the tuner of claim 12, in which said modifying means comprises a network of impedance elements adapted to be connected between selected contacts of said two sets of contacts, said network having an intermediate node, the voltage at said intermediate node nominally having a different known voltage value depending upon the particular contacts between which said network is connected, and means actuated by said selecting means and effective to provide at said intermediate node a voltage having substantially the value as said known voltage value corresponding to said selected set of contacts.

17. The tuner of claim 16, in which said selecting means comprises means effective to selectively operatively connect different numbers of said impedance elements to said tuning element.

18. In the tuner of claim 16, a compensating impedance, said selecting means comprising means for for connecting said compensating impedance between the higher numbered contact to which said fine tuning impedance means is connected and the contact of the next higher number counting from said source.

19. In the tuner of claim 16, in which said means effective to vary the impedance of said tuning impedance means is manually actuatable independently of said means for connecting a selected one of said terminals to said tuning element.

20. In the tuner of claim 16, in which the values of said impedance elements and the action of said selecting means are such that the voltage profile defined by the voltage levels applied to said tuning element as said selecting means is actuated substantially conforms to the voltage-reactance profile of said tuning element over the range involved.

21. A tuner for use in a communication receiver comprising a tuning element having a predetermined correspondence between its tuned frequency and the level of a tuning signal applied thereto, said tuner comprising a series of terminals, means effective to establish a different predetermined signal level at each of said terminals, the difference between the signal levels at each adjacent pair of terminals in said series of terminals being such as to cause the tuned frequency of said tuning element to vary in substantially equal increments when signals at said levels are applied thereto, and selecting means effective when actuated to operatively connect a selected one of said terminals to said tuning element, thereby to cause said tuning element to have a desired tuned frequency, further comprising signal modifying means for selectively tuning said tuner to frequencies within said increments said selecting means comprising means effective to operatively connect said modifying means to said selected one of said terminals and to said tuning element, comprising an output node adapted to be operatively connected to the tuning element, a first node and a second node, means operatively connecting said modifying means to said first and second nodes, said first mentioned selecting means comprising means effective to connect said selected one of said terminals to said first node and to operatively connect said second node to a subsequent one of said terminals following the selected one of said terminals, thereby to operatively connect said modifying means to said selected and said subsequent terminals.

22. The tuner of claim 21, in which said modifying means comprises a variable tuning impedance means, said selecting means comprising second means effective to vary the impedance of said fine tuning impedance means.

23. The tuner of claim 21, in which said signal level establishing means comprises a plurality of impedance means connected in parallel across a voltage source, said terminals comprising two sets of contacts, the contacts of one set being connected to intermediate points on the first and subsequent impedance means counting from said source, the contacts of said other set being connected to intermediate points on the second and subsequent impedance means counting from said source.

24. The tuner of claim 22, in which said signal level establishing means comprises a plurality of impedance means connected in parallel across a voltage source, said terminals comprising two sets of contacts, the contacts of one set being connected to intermediate points on the first and subsequent impedance means counting from said source, the contacts of said other set being connected to intermediate points on the second and subsequent impedance means, counting from said source.

25. In a communication receiver having the capability of receiving signals within first and second discrete frequency bands, a tuning stage comprising a first tuner for receiving signals at said first frequency band, a second tuner for receiving signals at said second frequency band, each of said tuners comprising a tuning element having a reactance value proportional to the level of a tuning signal applied thereto, a source of operating potential, first and second tuning circuits each comprising a plurality of sources to tuning signals, and frequency selecting means effective when in a first operating mode to operatively connect a selected one of said tuning signal sources in said first tuning circuit and said potential source to said first tuner and to disconnect said potential source from said second tuner, thereby to actuate and tune said first tuner and deactuate said second tuner, and effective when in a second operating mode to operatively connect a selected one of said tuning signal sources in said second tuning circuit and said potential source to said second tuner, and to disconnect said potential source from said first tuner, thereby to deactuate said first tuner and actuate and tune said second tuner, in which said frequency selecting means comprises sets of units and tens digital switches, actuation of a first predetermined number of switches corresponding to a selected channel within said first frequency band being effective to establish in said tuner said first operating mode and to connect to said first tuner said tuning signal of said first tuning circuit corresponding to the selected channel in said first band, actuation of a different number of switches corresponding to a selected channel within said second frequency band being effective to establish in said tuner said second operating mode and to connect to said second tuner said tuning signal of said second tuning circuit corresponding to the selected channel in said second band.

26. The tuner of claim 25, in which said frequency selecting means comprises a plurality of selectively actuatable switch means each operatively connected to said tuning signal sources of both said first and second tuning circuits and effective when actuated to connect said sources to said tuning circuits, and an additional switch means actuatable between first and second positions and effective to establish in said tuner said first and second modes of operation respectively.

27. The tuner of claim 25, in which said "tens" set of switches comprises a first contact and a plurality of other contacts, and said units switches comprise first and second groups of contacts, the selective actuation of said first contact of said "tens" switches and said first group of units switches defining said first operating mode, and the selective actuation of said first contact of said "tens" switches and a number of switches from the class consisting of said second group of units switches and any of said other of said "tens" switches independent of said units switches defining said second operating mode.